No. 633,775. Patented Sept. 26, 1899.
T. VON ZWEIGBERGK.
BEARING.
(Application filed June 30, 1899.)
(No Model.)
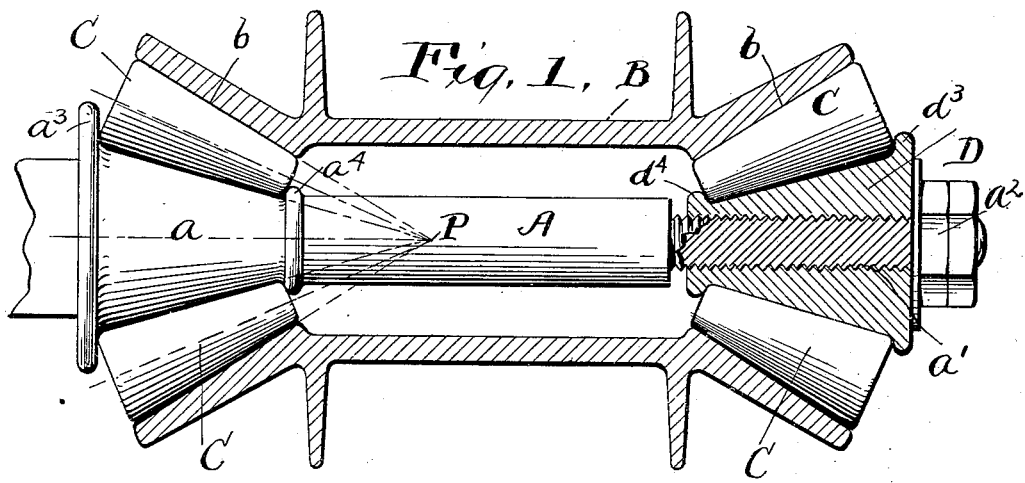
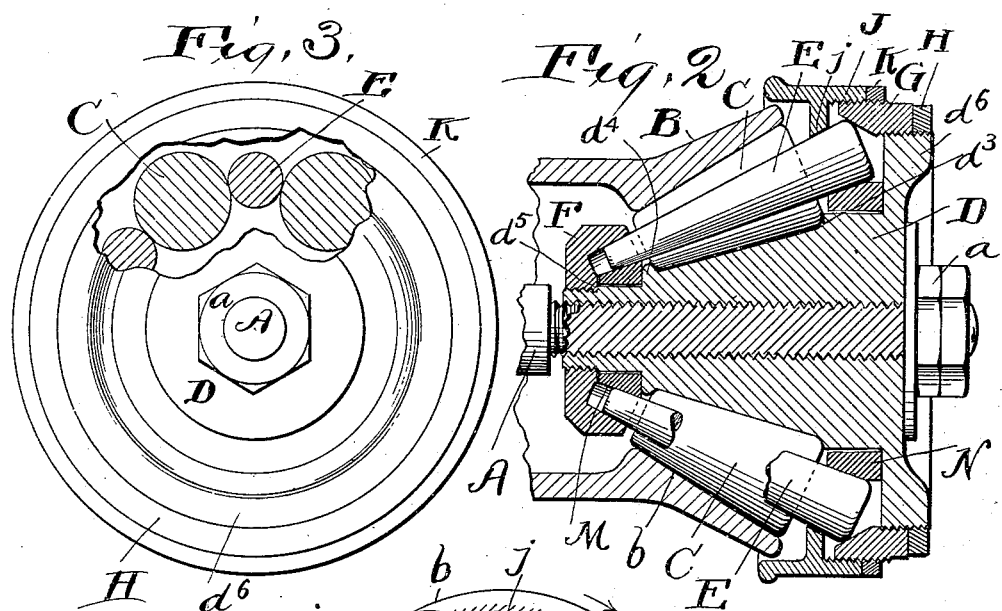
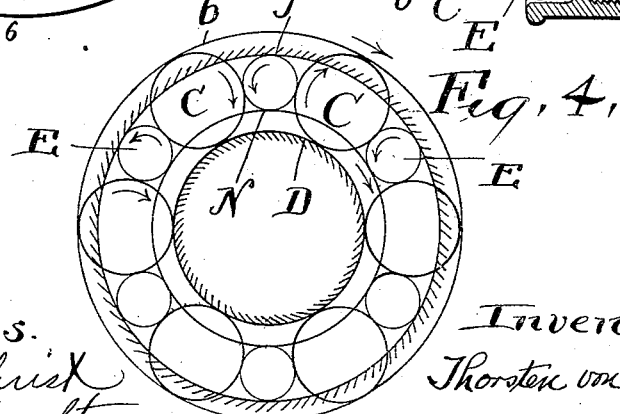
Witnesses.
E. B. Gilchrist
Philip E. Knowlton
Inventor.
Thorsten von Zweigbergk,
By his Attorneys,
Thurston & Bates.

UNITED STATES PATENT OFFICE.

THORSTEN VON ZWEIGBERGK, OF CLEVELAND, OHIO.

BEARING.

SPECIFICATION forming part of Letters Patent No. 633,775, dated September 26, 1899.

Application filed June 30, 1899. Serial No. 722,373. (No model.)

*To all whom it may concern:*

Be it known that I, THORSTEN VON ZWEIGBERGK, residing at Cleveland, in the county of Cuyahoga and State of Ohio, have invented a certain new and useful Improvement in Bearings, of which the following is a full, clear, and exact description, reference being had to the accompanying drawings.

The object of my invention is to reduce the friction of roller-bearings by keeping the bearing-rollers apart without adding undue friction in doing so. I accomplish this by placing between the bearing-rollers separating-rollers which bear on such surfaces that they are caused to rotate in the opposite direction from the bearing-rollers, so that the contacting surfaces roll instead of slide.

The invention consists of the means for efficiently performing this, as hereinafter described, and set out in the claims.

The drawings clearly illustrate my invention.

Figure 1 is a vertical central longitudinal section of the bearing as applied to a hub and axle. Fig. 2 is a vertical central longitudinal section of the outer end of such bearing embodied with my means for keeping the bearing-rollers separated. Fig. 3 is an end view, partly broken away, of the bearing shown in Fig. 2. Fig. 4 is a diagram illustrating the direction of movement of the rolling members shown in Fig. 2.

Referring to the parts by letters, A and B represent the two members of the bearing which are to be antifrictionally journaled. A may be considered, for example, as a carriage-axle, and B the hub of the wheel.

C represents the conical antifriction-rollers, which roll in raceways formed by the female conical surface $b$ within the flaring ends of the hub and the male conical surfaces $a$ and D on the axle. The surface or cone $a$ is preferably integral with the axle, and the cone D is adjustable by screwing onto a threaded end $a'$ of the axle, the nuts $a^2$ being provided to hold the cone D in place. The rollers C are held in the bearing by flanges $a^3$ and $d^3$ on the two cones just beyond the conical surfaces thereof. Similar flanges $a^4$ and $d^4$ are provided at the inner ends of the cones. The slant height of the cones $a$ and D between the flanges $a^3$ $a^4$ and $d^3$ $d^4$ is substantially the same as the slant height of the rollers C. The theoretical apex of either conical surface on the hub is at a point indicated by P on the axis of the bearing. This same point is the apex of the cone $a$ or D and of the conical rollers rolling thereon, as well as on the axis of those rollers. This construction maintains the bearing perfectly true. The bearing just described has the large supporting-surface incident to roller-bearings, but is also adapted to resist end thrust, which roller-bearings are not. My bearing may also be very conveniently and easily adjusted by simply turning the cone D and locking it with the jam-nuts $a^2$.

In order to still further reduce the friction of the bearing, I may put conical separating-rollers between the bearing-rollers C, these separating-rollers being so supported that the surface in contact with the bearing-roller rolls in the same direction with that roller instead of opposite to it. Such a construction is shown in Figs. 2 and 3. There the bearing-rollers C are separated by smaller conical rollers E, which are supported on their outer surface by members which are stationary with respect to the support for the inner surface of the bearing-rollers. Thus the rollers E bear at the outer surface of their inner ends on the nut F, which screws onto the cone D against a shoulder $d^5$ thereon, and at their larger ends these separating-rollers bear on their outer sides upon the ring G, which screws onto a flange $d^6$ of the cone and is locked by a jam-nut H, and also against the flange $j$ of the ring J, which screws onto the ring G and is locked by a jam-nut K. Thus the outer surface of the separating-rollers rolls in the same direction as the inner surface of the bearing-rollers.

The inner surface of the separating-rollers is supported by loose rings M and N. The bearing-rollers contacting with the separating-rollers cause them to roll, and they give movement in the opposite direction to the rings M and N. The latter are loose on the cone D. The friction caused by their contact with the supporting-cone is immaterial, as they bear none of the weight, and they may even be out of actual contact with that cone on their cylindrical surface. The arrangement of the two rings G and J allows a ready adjustment of these separating-rollers. After the main bearing is adjusted by the cone D and the nuts $a^2$ the ring G is screwed toward the hub until the separating-rollers E take up the loose play between the bearing-rollers. This ring is then locked by the jam-nut H, and the ring J is screwed toward the outer end of the bearing until the surface $j$ contacts with the separating-rollers, when the latter ring is locked by the jam-nut K. This ring not only furnishes an additional bearing for the separating-rollers, but also serves as a dust-cap to protect the bearing.

When the separating-rollers are used, the bearing at the other end of the hub is substantially the same as that shown in Fig. 2, except the cone may be rigid with the axle. In installing such bearing the nut H and the ring G may be screwed onto the corresponding stationary cone, the rings N and M put in place, the separating-rollers placed on them, and the rings J and the nut F screwed on. The bearing-cones C may then be placed around the surface and the hub slipped on with its conical surface against them, and the nut D, with the parts it carries previously placed on it, screwed into place.

The diagram Fig. 4 indicates how the separating-rollers roll on the bearing-rollers, preventing the friction which would result from the bearing-rollers rubbing past each other in opposite directions. If the hub is revolved in the right-hand direction, the surfaces D and $j$ remaining stationary, the rollers C will be given a right-hand rotation and the rollers E a left-hand rotation, the latter giving to the ring N a right-hand rotation.

Having described my invention, I claim—

1. The combination, with a roller-bearing, of a set of separating-rollers lying between the bearing-rollers and extending longitudinally beyond them, the ends of the separating-rollers rolling on one side on a surface which is in the same condition of rest or movement in the same direction as the surface on which the opposite side of the bearing-rollers roll, substantially as described.

2. In a bearing, in combination, a male member, a female member, a set of bearing-rollers between said members, a set of separating-rollers between the bearing-rollers, said separating-rollers being of smaller diameter and longer than the bearing-rollers and extending beyond them at each end, female surfaces on which the outer sides of the projecting ends of said separating-rollers bear which surfaces in operation are rigid with said male member, substantially as described.

3. The combination with a member having a male conical surface, and a member having a female conical surface, which surfaces are at different angles to the axis, a set of conical bearing-rollers rolling between the said surfaces, and a second set of rollers between the bearing-rollers and separating them, said separating-rollers rolling on their outer sides on a surface which is stationary with respect to the said male conical surface, substantially as described.

4. The combination with a member having a male surface, a surrounding member having a female surface, a set of bearing-rollers rolling between them, a set of separating-rollers between the bearing-rollers, a female surrounding bearing for the separating-rollers stationary with respect to the male surface of the main bearing, and loose rings forming an inner support for the separating-rollers, substantially as described.

5. The combination of a cone D, a surrounding member having a conical surface $b$, and the bearing-rollers C between them, with the separating-rollers E between the rollers C, a nut F and a ring G screwing onto the cone D and forming an outer bearing for the separating-rollers, and the rings M and N loosely surrounding the cone D and forming an inner bearing for the separating-rollers, substantially as described.

6. The combination with a cone D, the ring N loosely surrounding the same, a ring G screwing onto the cone, ring J screwing onto the ring G, a surrounding member of the bearing, having a female conical surface $b$; the rollers C between said surface and the cone, and the separating-rollers E between the rollers C, said separating-rollers bearing at their inner surface on the ring N, and their outer surface on the ring J, and their outer ends against the ring G, and means for supporting the other end of the said separating-rollers, substantially as described.

In testimony whereof I hereunto affix my signature in the presence of two witnesses.

THORSTEN VON ZWEIGBERGK.

Witnesses:
A. W. MAYERS,
ALBERT H. BATES.